L. CLARKE.
Hay Raker and Loader.

No. 74,307.

Patented Feb. 11, 1868.

United States Patent Office.

LEROY CLARKE, OF CANDOR, NEW YORK.

Letters Patent No. 74,307, dated February 11, 1868.

IMPROVEMENT IN HAY-RAKERS AND LOADERS.

*The Schedule referred to in these Letters Patent and making part of the same.*

TO ALL WHOM IT MAY CONCERN:

Be it known that I, LEROY CLARKE, of Candor, in the county of Tioga, and State of New York, have invented certain new and useful Improvements in Hay-Loaders; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a novel construction of an apparatus for use in connection with a wagon or cart, for loading the hay thereon, as hereinafter described.

Figure 1:
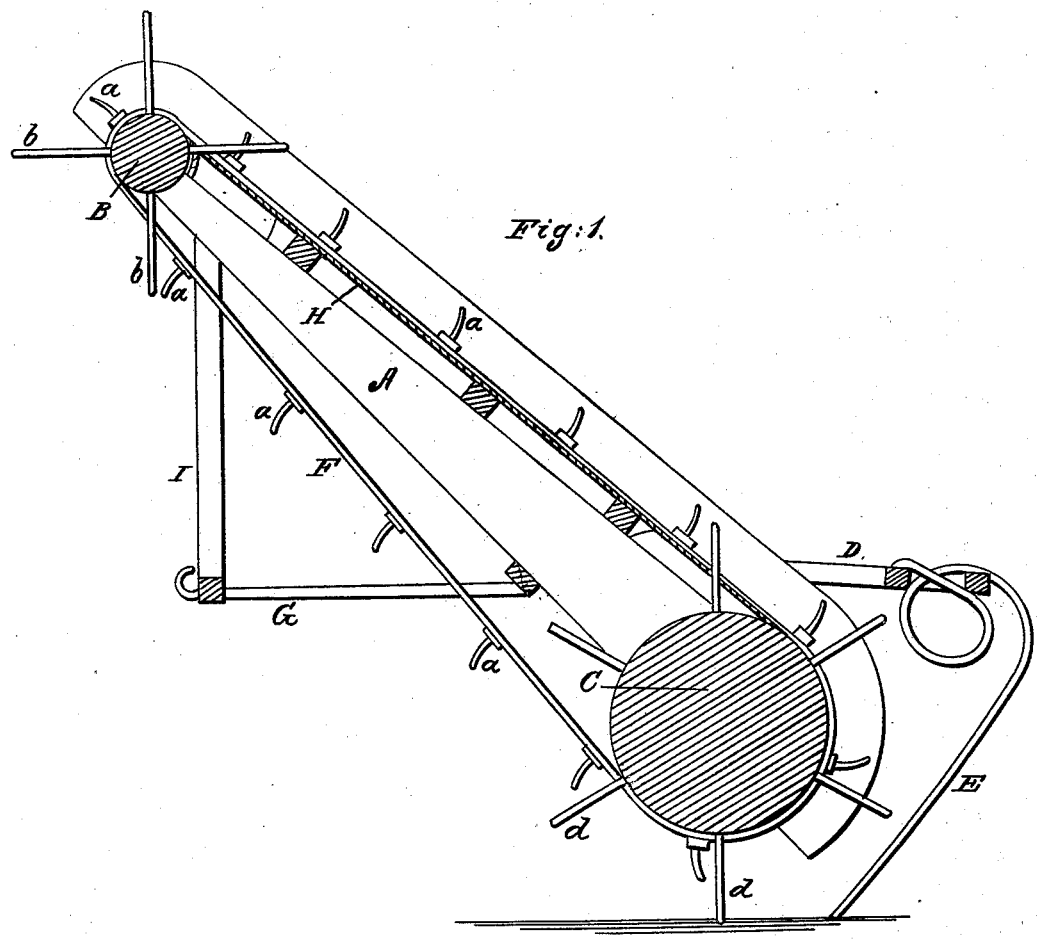
Figure 1 is a longitudinal vertical section.
Figure 2:
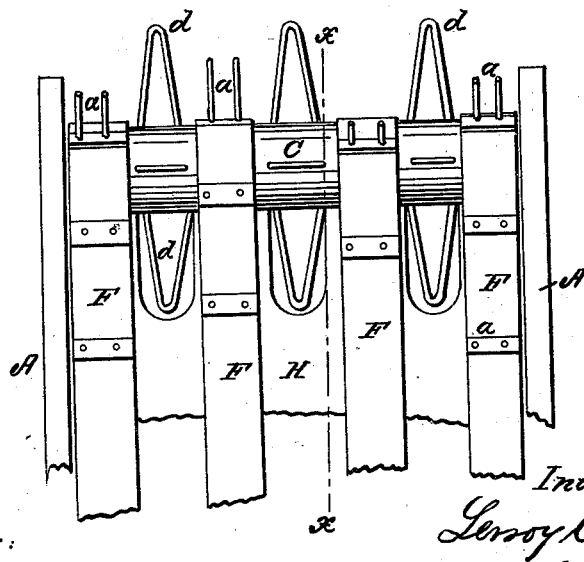
Figure 2 is a top plan view of the lower end or portion, with the rake omitted.

In constructing my improved hay-loader I make a frame, consisting of two side-pieces, A, united by suitable cross-bars, and having a transverse partition or flooring, H. In the upper end of this frame I locate a cylinder, B, provided with a series of radial arms, $b$, and in the lower end I locate another and larger cylinder, C, provided with a series of radial arms, $d$, the construction or form of which is more clearly shown in fig. 2. I then provide a series of straps or endless belts, F, provided at frequent intervals with projecting teeth, $a$, and place them around the cylinders B C, as shown. The floor or partition H has openings cut in it at each end, to permit the arms $d$ and $b$ to pass through as the cylinders revolves. To the rear or lower end of the machine is attached a frame, D, provided with a series of spring-teeth, E, of proper length to reach the ground and act as a rake in the rear of the cylinder C, as shown in fig. 1. To the under side of the frame a rod, G, is attached, which extends forward to near the front end of the frame, where it is connected to a vertical frame, I, which serves to support the front end of the apparatus, when the rod G is attached to the rear end of a wagon or cart, as it is when used. It will be observed that the belts F are so placed on the cylinders as to leave a space between them, sufficient to permit the arms $d$ to pass between them without hindrance.

The operation is as follows: The apparatus being attached to the rear end of a wagon or cart, so that its front end shall project slightly over the body or rack placed thereon, the wagon with the apparatus is then drawn along over the windrow of hay, the rear end resting on the ground, and the arms $d$ being forced by its weight into and through the hay, which, as the cylinder C revolves, gathers up and carries the hay up on to the belts F, where it is carried onward by the teeth $a$, until it arrives at the upper end, where the clearing-arms $b$ serve to remove it from the teeth $a$ of the belts F, and it then falls into the wagon-body, box, or rack. As it passes along, the rake-teeth E gather up the loose hay, and prevent any from being left.

It is obvious that the apparatus may be used anywhere in the field, when the hay is not gathered into windrows, but such a plan is not deemed most economical.

Having thus described my invention, what I claim is—

1. The hay-loading apparatus, consisting of the belts F provided with the teeth $a$, and the cylinders B and C provided with the arms $b$ and $d$, all mounted in a suitable frame, and arranged to operate substantially as described.

2. In combination with the cylinders B C and belts F, all provided with the arms, as above described, I claim the spring-teeth, arranged as set forth.

LEROY CLARKE.

Witnesses.
J. CLARKE,
E. BROWN.